United States Patent
Diab

(10) Patent No.: US 8,089,984 B2
(45) Date of Patent: Jan. 3, 2012

(54) METHOD AND SYSTEM FOR NETWORK COMMUNICATIONS VIA A CONFIGURABLE MULTI-USE ETHERNET PHY

(75) Inventor: Wael William Diab, San Francisco, CA (US)

(73) Assignee: Broadcom Corporation, Irvine, CA (US)

( * ) Notice: Subject to any disclaimer, the term of this patent is extended or adjusted under 35 U.S.C. 154(b) by 281 days.

(21) Appl. No.: 12/490,209

(22) Filed: Jun. 23, 2009

(65) Prior Publication Data

US 2010/0322105 A1   Dec. 23, 2010

(51) Int. Cl.
*H04L 12/66* (2006.01)
(52) U.S. Cl. ......... 370/463; 370/412; 370/236; 370/465
(58) Field of Classification Search .................. None
See application file for complete search history.

(56) References Cited

U.S. PATENT DOCUMENTS

| | | | |
|---|---|---|---|
| 5,856,980 A | 1/1999 | Doyle | |
| 6,029,202 A | 2/2000 | Frazier et al. | |
| 6,348,101 B1 | 2/2002 | Walter | |
| 6,504,849 B1 | 1/2003 | Wang et al. | |
| 6,522,271 B2 | 2/2003 | Calvignac et al. | |
| RE38,309 E * | 11/2003 | Frazier et al. | 370/231 |
| 6,980,007 B1 | 12/2005 | Lo et al. | |
| 2002/0027888 A1 | 3/2002 | Creigh | |
| 2004/0179540 A1 * | 9/2004 | Lee et al. | 370/401 |
| 2005/0147071 A1 * | 7/2005 | Karaoguz et al. | 370/338 |
| 2006/0109784 A1 * | 5/2006 | Weller et al. | 370/229 |
| 2008/0069014 A1 | 3/2008 | Powell et al. | |
| 2008/0069144 A1 | 3/2008 | Yu et al. | |
| 2010/0128738 A1 | 5/2010 | Barass | |
| 2010/0241880 A1 | 9/2010 | Wertheimer et al. | |
| 2010/0262848 A1 | 10/2010 | Bobrek et al. | |

OTHER PUBLICATIONS

Wael William Diab & Howard Frazier, "Ethernet in the First Mile: Access for Everyone." IEEE, 2006. p. 355-361.

* cited by examiner

*Primary Examiner* — Duc C Ho

(74) *Attorney, Agent, or Firm* — McAndrews, Held & Malloy, Ltd.

(57) ABSTRACT

Aspects of a method and system for network communications via a configurable multi-use Ethernet PHY are provided. In this regard, an Ethernet PHY may be configured based on characteristics of a network link over which the Ethernet PHY communicates, and a rate at which data is conveyed from a MAC to the Ethernet PHY may be controlled via a carrier sense signal of the MII. The carrier sense signal may be controlled based on a rate at which the Ethernet PHY transmits data over the network link. The Ethernet PHY may be configured based on a length of the network link and/or on a grade of the network link, where exemplary grades may comprise Cat-1 through Cat-7a cable. The Ethernet PHY may be configured into one of a plurality of modes comprising an Ethernet over digital subscriber line (DSL) mode, an extended reach mode, and a standard Ethernet mode.

19 Claims, 10 Drawing Sheets

METHOD AND SYSTEM FOR NETWORK COMMUNICATIONS VIA A CONFIGURABLE MULTI-USE ETHERNET PHY

CROSS-REFERENCE TO RELATED APPLICATIONS/INCORPORATION BY REFERENCE

Not Applicable

FIELD OF THE INVENTION

Certain embodiments of the invention relate to networking. More specifically, certain embodiments of the invention relate to a method and system for network communications via a configurable multi-use Ethernet PHY.

BACKGROUND OF THE INVENTION

With the increasing popularity of electronics such as desktop computers, laptop computers, and handheld devices such as smart phones and PDA's, communication networks are becoming an increasingly popular means of exchanging data of various types and sizes for a variety of applications. One set of networking technologies, namely Ethernet, has been particularly successful with regard to deployment in local area networks (LANs) and has made networking useful and affordable to individual and business customers of all levels and sizes. Everyday more and more devices are being equipped with Ethernet interfaces and Ethernet is increasingly being utilized to carry information of all types and sizes including voice, data, and multimedia. Due to the ubiquity of Ethernet in LANs, the advantages of using Ethernet in wide area networks are being recognized and Efforts such as Ethernet in the First Mile IEEE 802.3ah seek to realize these advantages. As the role of Ethernet expands to networks of all topologies and/or technologies, however, equipment manufacturers, service providers, and network administrators are presented with new economic and technological challenges.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for network communications via a configurable multi-use Ethernet PHY, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for network communications via a configurable multi-use Ethernet PHY. In various embodiments of the invention, a first Ethernet PHY may be configured based on characteristics of a network link over which the first Ethernet PHY communicates, and a rate at which data is conveyed from a first media access controller (MAC) to the first Ethernet PHY via a media independent interface (MII) may be controlled via a carrier sense signal of the MII. The carrier sense signal may be controlled based on a rate at which the first Ethernet PHY transmits data over the network link. The rate at which the first Ethernet PHY transmits data over the network link may be determined by monitoring a queue that buffers data to be transmitted. The carrier sense signal may be asserted when an amount of data stored in the queue is above a threshold. The carrier sense signal may be de-asserted when the amount of data stored in the queue is below a threshold. The first Ethernet PHY may be configured based on a length of the network link. The first Ethernet PHY may be configured based on a grade of the network link, where exemplary grades may comprise Cat-1 through Cat-7a cable. The first Ethernet PHY may be configured into one of a plurality of modes comprising an Ethernet over digital subscriber line (DSL) mode, an extended reach mode, and a standard Ethernet mode. The MII may comprise one of a media independent interface (MII), a gigabit MII (GMII), a reduced MII (RMII), reduced gigabit MII (RGMII), and 10 gigabit MII (XGMII).

In some embodiments of the invention, the first Ethernet PHY, the first MAC, a second Ethernet PHY, and a second MAC may be integrated within a network device. In such embodiments, data may be received by the second Ethernet PHY, buffered in a queue, and transmitted by the first Ethernet PHY, where the second Ethernet PHY receives the data at a rate that may be different than the rate at which the first Ethernet PHY transmits the data. In some instances, the second Ethernet PHY may be operable to request that a link partner pause or slow down transmission of data based on a status of the queue.

Figure 1:
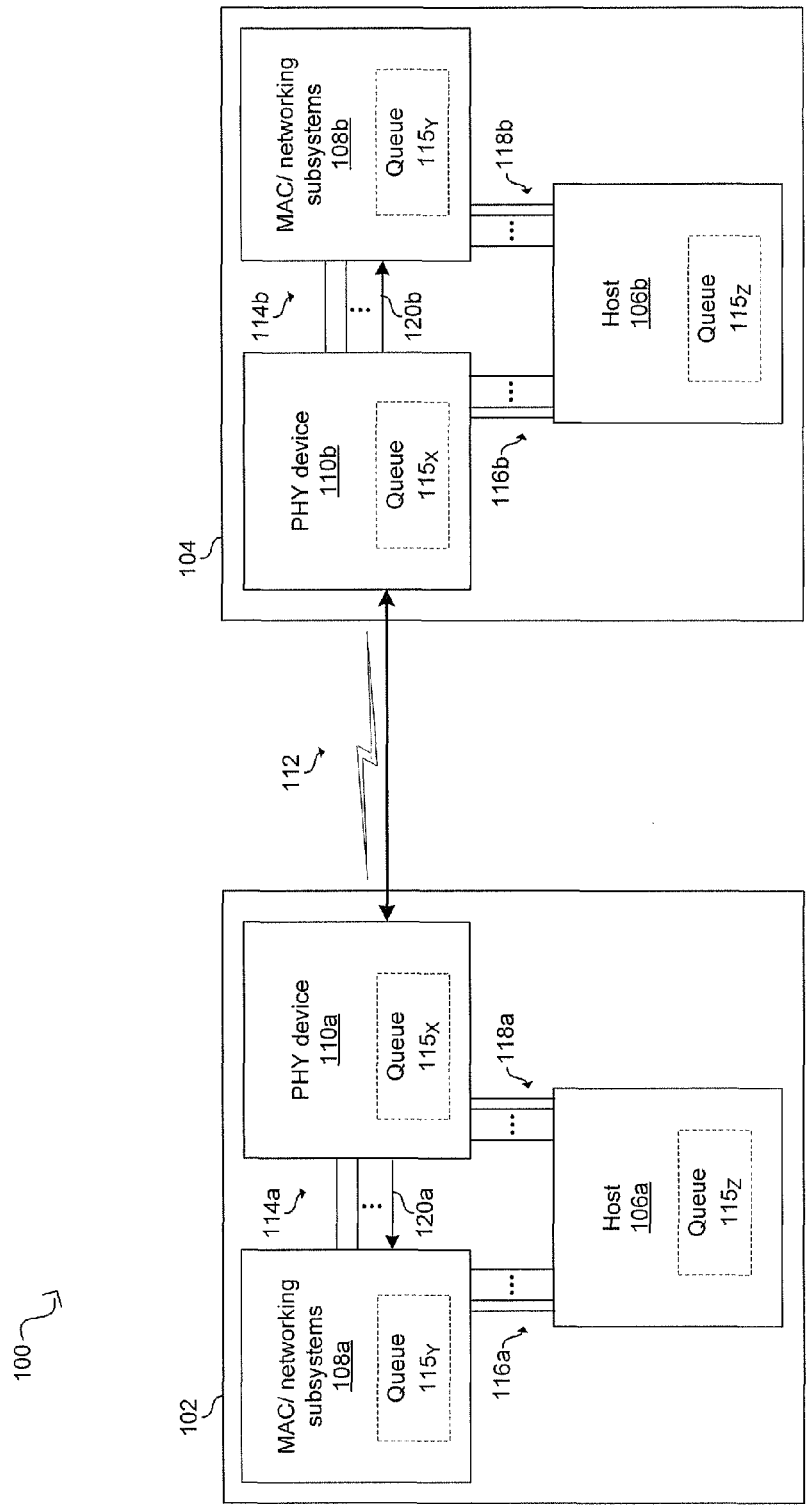
FIG. 1 is a functional block diagram illustrating an exemplary Ethernet connection between two network devices, which may comprise configurable multi-use PHYs, in accordance with an embodiment of the invention.

FIG. 1 is a functional block diagram illustrating an exemplary Ethernet connection between two network devices, which may comprise configurable multi-use PHYs, in accordance with an embodiment of the invention. Referring to FIG. 1, there is shown a system 100 that comprises a network device 102 and a network device 104. The network devices 102 and 104 may be link partners that communicate via the link 112 and may comprise, respectively, hosts 106a and 106b, networking subsystems 108a and 108b, PHY 110a and 110b, interfaces 114a and 114b, interfaces 116a and 116b, and interfaces 118a and 118b. The interfaces 114a and 114b are referenced collectively or separately herein as interface(s) 114, and the interfaces 116a and 116b are referenced collectively or separately herein as interface(s) 116. The hosts 106a and 106b are referenced collectively or separately herein as host(s) 106. The networking subsystems 108a and 108b are referenced collectively or separately herein as networking subsystem(s) 108. The PHY 110a and 110b are referenced collectively or separately herein as PHY(s) 110.

The link 112 is not limited to any specific medium. Exemplary link 112 media may comprise copper, wireless, optical and/or backplane technologies. For example, a copper medium such as STP, Cat3, Cat 5, Cat 5e, Cat 6, Cat 7 and/or Cat 7a as well as ISO nomenclature variants may be utilized. Additionally, copper media technologies such as InfiniBand, Ribbon, and backplane may be utilized. With regard to optical media for the link 112, single mode fiber as well as multi-mode fiber may be utilized. With regard to wireless, the network devices 102 and 104 may support one or more of the 802.11 family of protocols. In various embodiments of the invention, the network device 102 and the network device 104 may communicate via two or more physical channels comprising the link 112. For example, Ethernet over twisted pair standards 10BASE-T and 100BASE-TX may utilize two pairs of UTP while Ethernet over twisted pair standards 1000BASE-T and 10GBASE-T may utilize four pairs of UTP.

The network devices 102 and/or 104 may comprise, for example, switches, routers, end points, computer systems, audio/video (A/V) enabled equipment, or a combination thereof. Additionally, the network devices 102 and 104 may be enabled to utilize Audio/Video Bridging and/or Audio/video bridging extensions (collectively referred to herein as audio video bridging or AVB) for the exchange of multimedia content and associated control and/or auxiliary data. Also, the network devices may be operable to implement security protocols such IPsec and/or MACSec.

The hosts 106a and 106b may be operable to handle functionality of OSI layer 3 and above in the network devices 102 and 104, respectively. The hosts 106a and 106b may be operable to perform system control and management, and may comprise hardware, software, or a combination thereof. The hosts 106a and 106b may communicate with the networking subsystems 108a and 108b via interfaces 116a and 116b, respectively. The hosts 106a and 106b may additionally exchange signals with the PHYs 110a and 110b via interfaces 118a and 118b, respectively. The interfaces 116a and 116b may correspond to PCI or PCI-X interfaces. The interfaces 118a and 118b may comprise one or more discrete signals and/or communication busses. In various embodiments of the invention, one or both of the hosts 106 may comprise one or more queues $115_Z$ for buffering received and/or to-be-transmitted data.

The networking subsystems 108a and 108b may comprise suitable logic, circuitry, and/or code that may be operable to handle functionality of OSI layer 2 and above layers in the network device 102 and 104, respectively. In this regard, networking subsystems 108 may each comprise a media access controller (MAC) and/or other networking subsystems. Each networking subsystem 108 may be operable to implement switching, routing, and/or network interface card (NIC) functions. Each networking subsystems 108a and 108b may be operable to implement Ethernet protocols, such as those based on the IEEE 802.3 standard, for example. Notwithstanding, the invention is not limited in this regard. The networking subsystems 108a and 108b may communicate with the PHYs 110a and 110b via interfaces 114a and 114b, respectively. The interfaces 114a and 114b may correspond to Ethernet interfaces that comprise protocol and/or link management control signals such as a carrier sense signal (CRS). The interfaces 114a and 114b may be, for example, multi-rate capable interfaces and/or media independent interfaces (xxMII). In this regard, "media independent interface (MII)" is utilized generically herein and may refer to a variety of interfaces such as a media independent interface (MII), a gigabit MII (GMII), a reduced MII (RMII), reduced gigabit MII (RGMII), and 10 gigabit MII (XGMII). In various embodiments of the invention, one or both of the networking subsystems 108 may comprise one or more queues $115_Y$ for buffering received and/or to-be-transmitted data.

The PHYs 110 may each comprise suitable logic, circuitry, interfaces, and/or code that may enable communication between the network device 102 and the network device 104. Each of the PHYs 110 may be referred to as a physical layer transmitter and/or receiver, a physical layer transceiver, a PHY transceiver, a PHYceiver, or simply a PHY. The PHYs 110a and 110b may be operable to handle physical layer requirements, which include, but are not limited to, packetization, data transfer and serialization/deserialization (SERDES), in instances where such an operation is required. Data packets received by the PHYs 110a and 110b from networking subsystems 108a and 108b, respectively, may include data and header information for each of the above six functional OSI layers. The PHYs 110a and 110b may be configured to convert packets from the networking subsystems 108a and 108b into physical layer signals for transmission over the physical link 112, and convert received physical signals into digital information. In some embodiments of the invention, the PHYs 110 may comprise suitable logic, circuitry, and/or code operable to implement MACSec. In various embodiments of the invention, one or both of the PHY devices 110 may comprise one or more queues $115_X$ for buffering receiving and/or to-be-transmitted data.

One or both of the PHYs 110 may comprise a twisted pair PHY capable of operating at one or more standard rates such as 10 Mbps, 100 Mbps, 1 Gbps, and 10 Gbps (10BASE-T, 100GBASE-TX, 1GBASE-T, and/or 10GBASE-T); potentially standardized rates such as 40 Gbps and 100 Gbps; and/or non-standard rates such as 2.5 Gbps and 5 Gbps. One or both of the PHYs 110 may comprise a backplane PHY capable of operating at one or more standard rates such as 10 Gbps (10GBASE-KX4 and/or 10GBASE-KR); and/or non-standard rates such as 2.5 Gbps and 5 Gbps. One or both of the PHYs 110 may comprise an optical PHY capable of operating at one or more standard rates such as 10 Mbps, 100 Mbps, 1 Gbps, and 10 Gbps; potentially standardized rates such as 40 Gbps and 100 Gbps; and/or non-standardized rates such as 2.5 Gbps and 5 Gbps. In this regard, the optical PHY may be a passive optical network (PON) PHY. One or both of the PHYs 110 may support multi-lane topologies such as 40 Gbps CR4, ER4, KR4; 100 Gbps CR10, SR10 and/or 10 Gbps LX4 and CX4. Also, serial electrical and copper single channel technologies such as KX, KR, SR, LR, LRM, SX, LX, CX, BX10, LX10 may be supported. Non-standard speeds and non-standard technologies, for example, single channel, two channel or four channels may also be supported. Moreover, TDM technologies such as PON at various speeds may be supported by the PHYs 110.

Also, the PHYs 110 may support transmission and/or reception at a high(er) data in one direction and transmission and/or reception at a low(er) data rate in the other direction. For example, the network device 102 may comprise a multimedia server and a link partner may comprise a multimedia client. In this regard, the network device 102 may transmit multimedia data, for example, to the link partner at high(er) data rates while the link partner may transmit control or auxiliary data associated with the multimedia content at low(er) data rates. The network device 102 may also support wireless protocols such as the IEEE 802.11 family of standards.

Each of the PHYs 110a and 110b may be operable to implement one or more energy efficient techniques, which may be referred to as energy efficient networking (EEN), or in the specific case of Ethernet, energy efficient Ethernet (EEE). For example, the PHYs 110a and 110b may be operable to support low power idle (LPI) and/or subrating techniques, such as subset PHY for Copper based PHYs. LPI may generally refer a family of techniques where, instead of transmitting conventional IDLE symbols during periods of inactivity, the PHYs 110a and 110b may remain silent and/or communicate signals other than conventional IDLE symbols. Subrating may generally refer to a family of techniques where the PHYs are reconfigurable, in real-time or near real-time, to communicate at different data rates.

In operation, For example, in some instances, data may be communicated from the network device 102 to the network device 104 over the link 112. In such instances, the networking subsystem 108a may communicate data via the interface 114a to the PHY 110a at a higher rate than the line rate, or other specified rate, at which the PHY 110a may operable to output the data onto the link 112. That is, the networking subsystem 108a and the PHY 110a may be mismatched with regard to an egress data rate. Consequently, a queue, such as one or more of the queues 115, that store the egress data may eventually overflow. Accordingly, the rate at which the PHY 110a is transmitting data and/or an amount of data waiting to be transmitted may be monitored and the PHY 110a may notify the networking subsystem to hold off sending more data to the PHY 110a until the PHY 110a is ready to receive more data without dropping or corrupting any data. In various embodiments of the invention, the PHY 110a may notify the MAC 108a via the CRS 120a and/or by generating one or more pause frames and conveying the pause frames up to the networking subsystem 108a via a receive path of the interface 114a.

In various embodiments of the invention, the CRS 120a may be controlled to match the rate at which data comes into the PHY 110a from the networking subsystem 108 with the rate at which the data is transmitted onto the link 112. In this regard, the PHY 110a may assert the CRS 120a during periods when the PHY 110a cannot handle additional data from the networking subsystem 108a. For example, the PHY 110a may be unable to handle additional data from the networking subsystem 108a when it is already transmitting data onto the link 112 at the line rate, or other specified maximum rate. The networking subsystem 108a may, accordingly, defer transmission until the PHY 110a de-asserts the CRS 120a. The PHY 110a may de-assert the CRS 120a when the PHY 110a can handle additional data from the networking subsystem 108a. For example, the PHY 110a may be able to handle data from the networking subsystem 108 when the rate at which the PHY 110a communicates data onto the link 112 drops below the line rate, or other specified rate.

In various embodiments of the invention, the PHY 110a may generate one or more pause frames and convey the pause frames up to the networking subsystem 108a during periods when the PHY 110a cannot handle additional data to be transmitted. For example, the PHY 110a may be unable to handle additional data from the networking subsystem 108a when it is already transmitting data onto the link 112 at the line rate, or other specified maximum rate. Once the PHY 110a is ready to received additional data from the networking subsystem 108 it may generate an unpause frame and convey the unpause frame up to the networking subsystem 108a. The pause and unpause frames may be sent to the networking subsystem 108 as if they were frames received from a link partner. Accordingly, the networking subsystem 108a may be operable to inspect received frames and distinguish pause and unpause frames from other received data. The networking subsystem 108a may hold-off conveying data to be transmitted to the PHY 110a during periods of time between receiving a pause frame and receiving a corresponding unpause frame. An unpause frame may, for example, comprise a pause frame with a wait time field set to 0. Additionally or alternatively, an MAC may resume sending data to the PHY upon expiration of a timer without having received an unpause frame.

In some embodiments of the invention, one or more queues in which the egress data is buffered may be monitored to determine whether the PHY 110a is ready to receive data from the networking subsystem 108a. For example, in instances that a queue 115 in which the egress data is stored reaches a threshold, the PHY 110a may assert the CRS 120a and/or generate a pause frame to pause or slow down the data being output by the networking subsystem 108a. Upon the occupied portion of the queue 115 dropping below a particular threshold, the PHY 110a may de-assert the CRS 120a and/or generate an unpause frame and, upon detecting the de-assertion of the CRS 120a and/or the receipt of the unpause frame, the networking subsystem 108a may resume sending data to the PHY 110a via the interface 114a.

In various embodiments of the invention, the Ethernet PHYs 110 may be configured based on characteristics of the link 112. The configuration of the PHYs 110 may, in turn, determine the rate at which the PHYs 110 are operable to communicate over the link 112. Exemplary characteristics of the link 112 factored into the configuration may comprise the length and/or grade or quality of the link 112. For example, in a local area network (LAN) the link 112 may comprise up to 100 meters of CAT-5 UTP, whereas in an Ethernet over DSL application, the link 112 may comprise up to 2.7 km of CAT-1 UTP.

Controlling the flow of traffic between a MAC and PHY utilizing the CRS 120 may thus enable utilizing a single configurable PHY device in various applications. Moreover, utilizing the CRS to control the data flow may enable the configurable multi-use PHY 110 to interface to a legacy MAC, regardless of whether that MAC communicates full-duplex or half-duplex, and regardless whether the MAC was designed for communication over high quality UTP at less than 100 meters, such as the 10/100/1G/10GBASE-T protocols, or for communication over lower grade UTP and/or longer links, such as the 10PASS-TS or 2BASE-TL protocols. That is, a multi-use configurable PHY 110 may be compatible with MACs designed for LAN applications, Ethernet over DSL applications, and other applications.

Figure 2A:
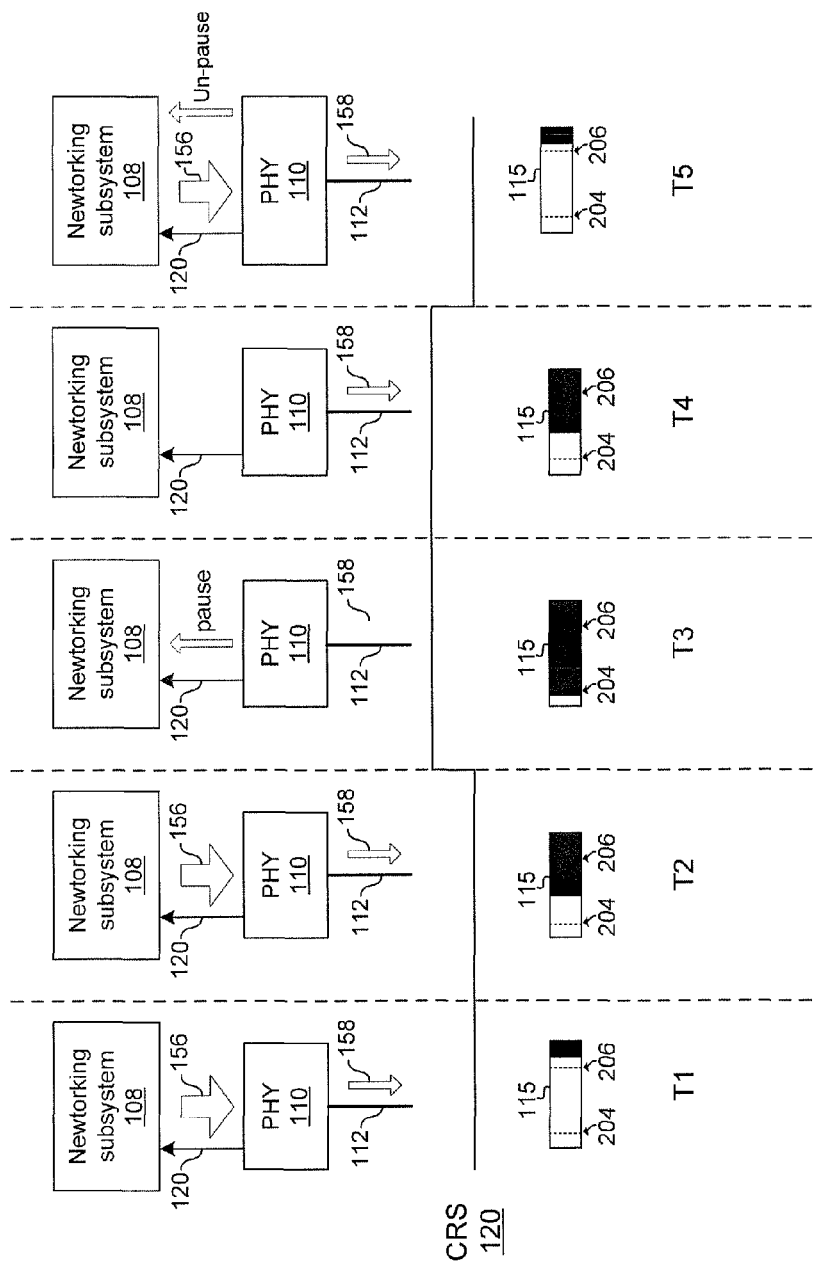
FIG. 2A is a diagram illustrating managing data transmission via a carrier sense signal of a media independent interface, in accordance with an embodiment of the invention.

FIG. 2A is a diagram illustrating managing data transmission via a carrier sense signal of a media independent interface, in accordance with an embodiment of the invention. Referring to FIG. 2A there is shown a networking subsystem 108, a PHY 110, a queue 115, and corresponding values of a CRS 120 during a sequence of time instants T1-T5.

The networking subsystem 108 may be as described with respect to FIG. 1. The PHY 110 may be the same as the PHYs 110a and 110b described with respect to FIG. 1. The queue 115 may be the same as one or more of the queues $115_X$, $115_Y$, and $115_Z$ described with respect to FIG. 1. The CRS 120 may be the same as the CRS signals 120a and 120b described with respect to FIG. 1.

At time instant T1, the queue 115 is not, or has not been, filled above the threshold 204. Accordingly, the CRS 120 is de-asserted and the networking subsystem 108 is communicating data to the PHY 110 at a high(er) data rate (as indicated by the large arrow 156) the PHY 110 is transmitting data onto the link 112 a low(er) rate (as indicated by the small arrow 158), where the rate at which the PHY 110 transmits onto the link 112 may be determined based on characteristics of the link 112.

At time instant T2, the queue 115 may have more data buffered in it than at time instant T1; however, the amount of data has still not surpassed the threshold 204 and thus the CRS 120 remains de-asserted and the data continues to be communicated from the networking subsystem 108 to the PHY 110.

At time instant T3, the amount of data in the queue 115 has risen above the threshold 204 and thus the CRS 120 may be asserted and/or a pause frame may be generated and conveyed to the networking subsystem 108. The PHY 110 may continue to drain the queue 115 by transmitting data onto the link 112.

At time instant T4, the PHY 110 may continue to transmit data and drain the queue 115; however, hysteresis may be utilized to prevent rapid toggling of the CRS 120 and thus, the CRS 120 may be de-asserted only when the level of data in the queue 115 drops below the threshold 206. Accordingly, the CRS 120 may remain asserted and communication from the networking subsystem 108 to the PHY 110 may remain paused.

At time instant T5, the amount of data in the queue 115 may drop below the threshold 206, accordingly the CRS 120 may be de-asserted and/or a pause frame may be generated and conveyed to the networking subsystem 108 and data may again be communicated from the networking subsystem 108 to the PHY 110.

Figure 2B:
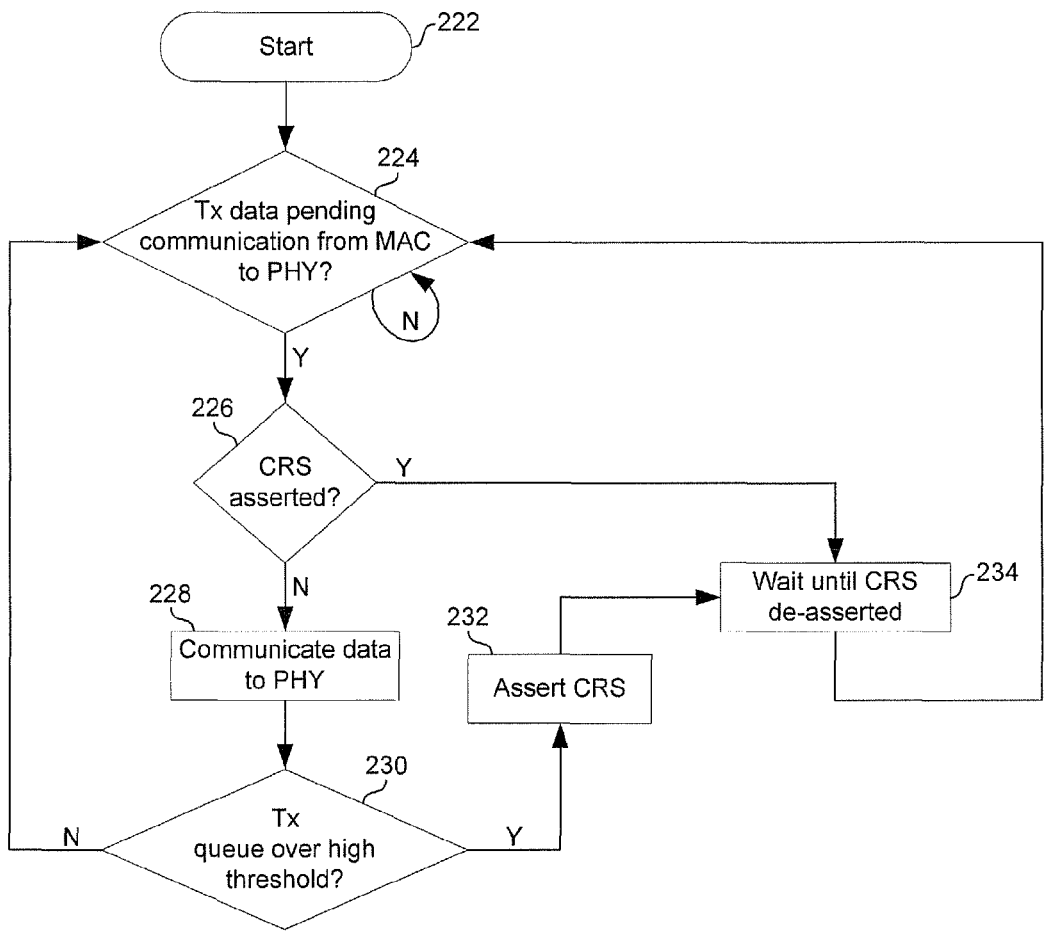
FIG. 2B is a flow chart illustrating exemplary steps for managing data transmission via a carrier sense signal of a media independent interface, in accordance with an embodiment of the invention.

FIG. 2B is a flow chart illustrating exemplary steps for managing communication of data from a MAC to a PHY via a carrier sense signal of a media independent interface, in accordance with an embodiment of the invention. Referring to FIG. 2B, from start step 222, the exemplary steps may advance to step 224 in which it may be determined whether there is data pending conveyance from a MAC to a PHY via an xxMII. In instances that there is no to-be-transmitted data pending communication from the MAC to the PHY, the steps may remain in step 224 until there is data to be communicated to the PHY. In instances that there is data pending communicated from the MAC to the PHY, the exemplary steps may advance to step 226.

In step 226 it may be determined whether a CRS signal of the xxMII between the MAC and PHY is asserted. In instances, that the CRS is asserted, the exemplary steps may advance to step 234.

In step 234, the MAC may hold off communication of data to the PHY until the PHY de-asserts the CRS. In this regard, the PHY 110 may de-assert the CRS signal when the amount of data buffered in a transmit queue drops below a threshold. Subsequent to step 234, the exemplary steps may return to step 224.

Returning to step 226, in instances that the CRS is not asserted, the exemplary steps may advance to step 228. In step 228, the MAC may communicate data to the PHY. Subsequent to step 228, the exemplary steps may advance to step 230.

In step 230, data communicated from the MAC to the PHY may be stored in a queue and it may be determined whether the additional data in the queue has filled the queue above a threshold. In instances that the queue is not filled above the threshold the exemplary steps may return to step 224. In instances that the queue is filled above the threshold the exemplary steps may advance to step 232.

In step 232 the PHY may assert the CRS. Subsequent to step 232, the exemplary steps may advance to step 234.

In step 234, the PHY may wait for the amount of data buffered in the queue to be below a threshold as data is read out from the queue and transmitted. Once the queue is below the threshold the PHY may de-assert the CRS and the exemplary steps may return to step 224

Figure 3:
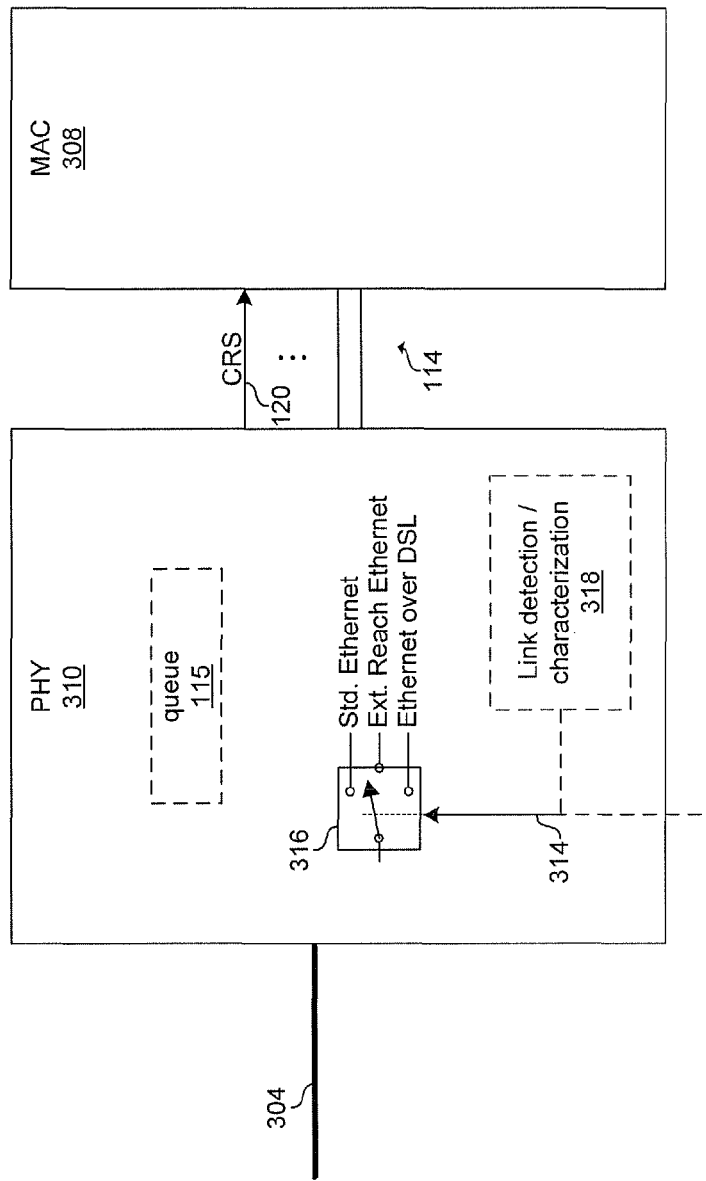
FIG. 3 is a functional block diagram illustrating a PHY configurable based on characteristics of a link over which it communicates, in accordance with an embodiment of the invention.

FIG. 3 is a functional block diagram illustrating a PHY configurable based on characteristics of a link over which it communicates, in accordance with an embodiment of the invention. Referring to FIG. 3 there is shown a PHY 310 and a MAC 308.

The PHY 310 may be similar to or the same as the PHYs 110a and 110b described with respect to FIG. 1. The MAC 308 may be similar to or the same as the networking subsystem 108, or a portion thereof, described with respect to FIG. 1. The CRS 120 may be as described with respect to FIG. 1.

The PHY 310 may comprise suitable logic, circuitry, interfaces, and/or code that may enable the PHY 310 to be configured into various modes of operation. The configurability of the PHY 310 is represented by the switching element 316 controlled by a signal 314. Additionally, as described with respect to FIGS. 1, 2A, and 2B, the PHY 310 may be operable to control the flow of data from the MAC 308 via the CRS 120 and/or by generating pause frames.

The link detection and/or characterization module 318 may comprise suitable logic, circuitry, code, and/or interfaces that may be operable to determine characteristics of the link 304 and generate the control signal 314 accordingly. Exemplary characteristics that may be determined by the module 318 may comprise length, grade, and/or number of available channels or conductors of the link 304.

In operation, the switching element 316 may be configured to select an appropriate mode of operation for communicating over the network link 304. In some embodiments of the invention, the PHY 310 may comprise the module 318 and configuration of the PHY 310 may be controlled based on an automatic link detection and/or characterization. In other embodiments of the invention, control signal 314, and thus configuration of the PHY 310, may be controlled via software and/or manually by a network administrator, application, or end-user.

Figure 4A:
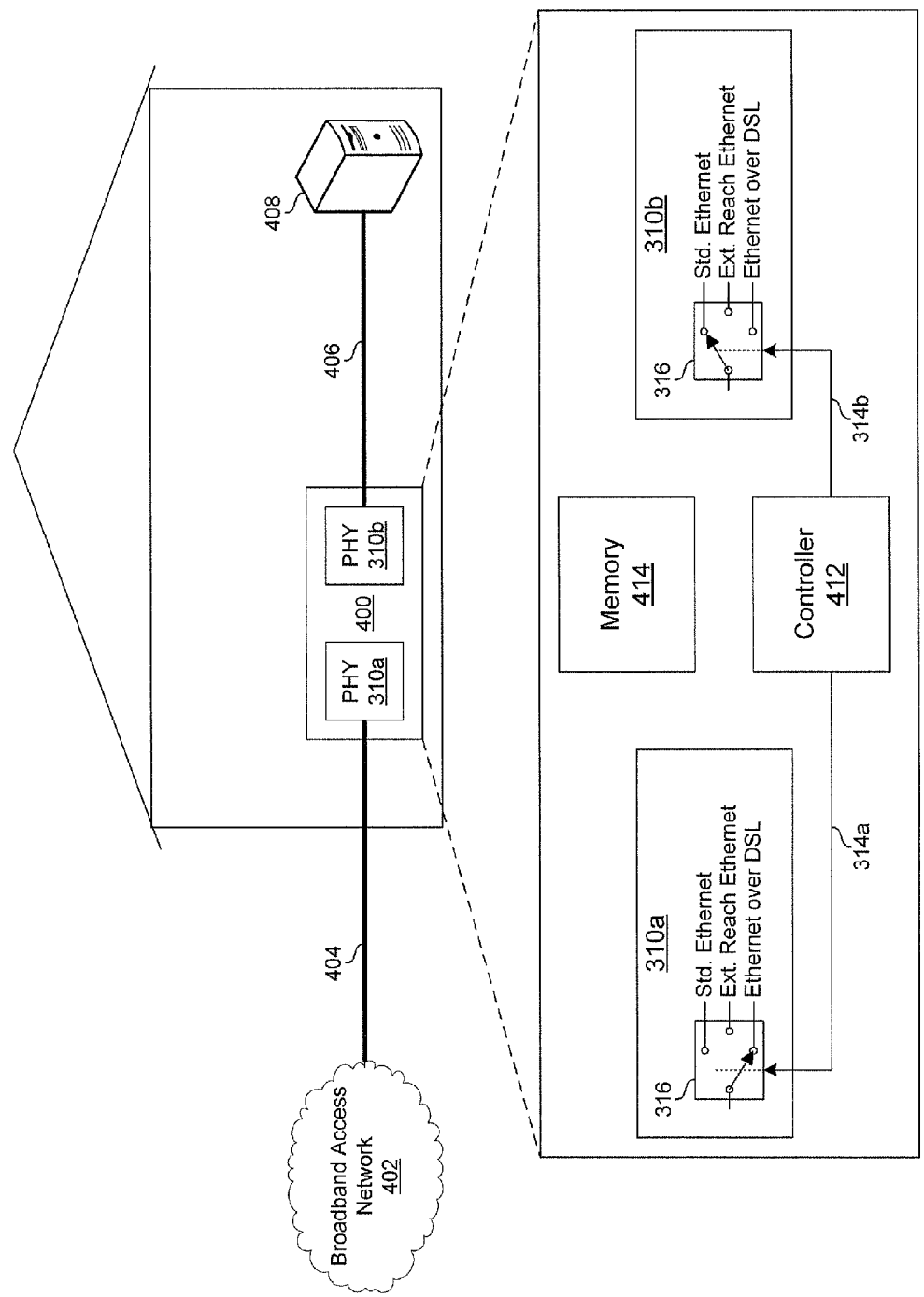
FIG. 4A is a diagram illustrating use of a configurable multi-use PHY for Ethernet over DSL communications, in accordance with an embodiment of the invention.

FIG. 4A is a diagram illustrating use of a configurable multi-use PHY for Ethernet over DSL communications, in accordance with an embodiment of the invention. Referring to FIG. 4A, there is shown a network device 400 communicatively coupled to a broadband access network 402 and a link partner 408. The network device 400 comprises a controller 412, a memory 414, and Ethernet PHYs 310a and 310b, which are operable to communicate over links 404 and 406, respectively.

The broadband access network 402 may be owned and/or operated by a service provider such as a telephone company. The broadband access network 402 may provide Internet connectivity to homes and business utilizing DSL.

The controller 412 may comprise suitable logic, circuitry, interfaces, and/or code that may be operable to process data and/or control operations of the network device 400. With regard to processing data, the controller 412 may enable packetization, de-packetization, transcoding, reformatting, and/or otherwise processing data received from and/or to be transmitted by the network device 400. With regard to controlling operations of the network device 400, the controller 412 may be enabled to provide control signals to the various other portions of the network device 400. In this regard, the controller 412 may be operable to make decisions and/or generate signals for configuring the Ethernet PHYs 310a and 310b. The controller 412 may also control data transfers between various portions of the network device 400. The controller 412 may enable execution of applications programs and/or code. In this regard, the applications, programs, and/or code may enable, for example, parsing, transcoding, or otherwise processing of data. Furthermore, the applications, programs, and/or code may enable, for example, configuring or controlling operation of the Ethernet PHYs 310a and 310b and/or the memory 414.

The memory 414 may comprise suitable logic, circuitry, and/or code that may enable storage or programming of information that includes parameters and/or code that may effectuate the operation of the network device 400. The parameters may comprise configuration data and the code may comprise operational code such as software and/or firmware and the parameters may include adaptive filter and/or block coefficients, but the information need not be limited in this regard. Additionally, the memory 400 may buffer or otherwise store received data and/or data to be transmitted. In various embodiments of the invention, the memory 400 may store instructions, parameters, of other information for configuring the Ethernet PHYs 310a and 310b. Each of the Ethernet PHYs 310a and 310b may be the same as the PHY 310, which is described with respect to FIG. 3.

In operation, the Ethernet PHYs 310a and 310b may be configured for communication over the respective links 404 and 406. In an exemplary embodiment of the invention, the link 404 may comprise voice grade UTP designed and/or suited for DSL and the link 406 may comprise less than 100 meters of CAT-5e UTP. Accordingly, the Ethernet PHY 310a may be configured into an Ethernet over DSL mode and the Ethernet PHY 310b may be configured into a standard Ethernet mode. In this regard, the coding and signaling techniques utilized by the Ethernet PHY 310a may adhere to, for example, 10PASS-TS or 2BASE-TL. In this regard, the network device 400 may function as a modem, router, and/or switch to provide Internet access to devices such as the device 408. The Ethernet PHY 310b, on the other hand, may utilize coding and signaling techniques that adhere to, for example, one of 10BASE-T, 100BASE-T, 1000BASE-T, or 10GBASE-T.

The protocols and link characteristics described with regard to FIG. 4A are for illustration purposes and the invention is not so limited. Also, the network device 400 comprises two PHYs for illustration only and a device such as network device 400 may comprise any number of Ethernet PHYs each of which may be configurable and/or may communicate over copper, optical fiber, or backplane.

Figure 4B:
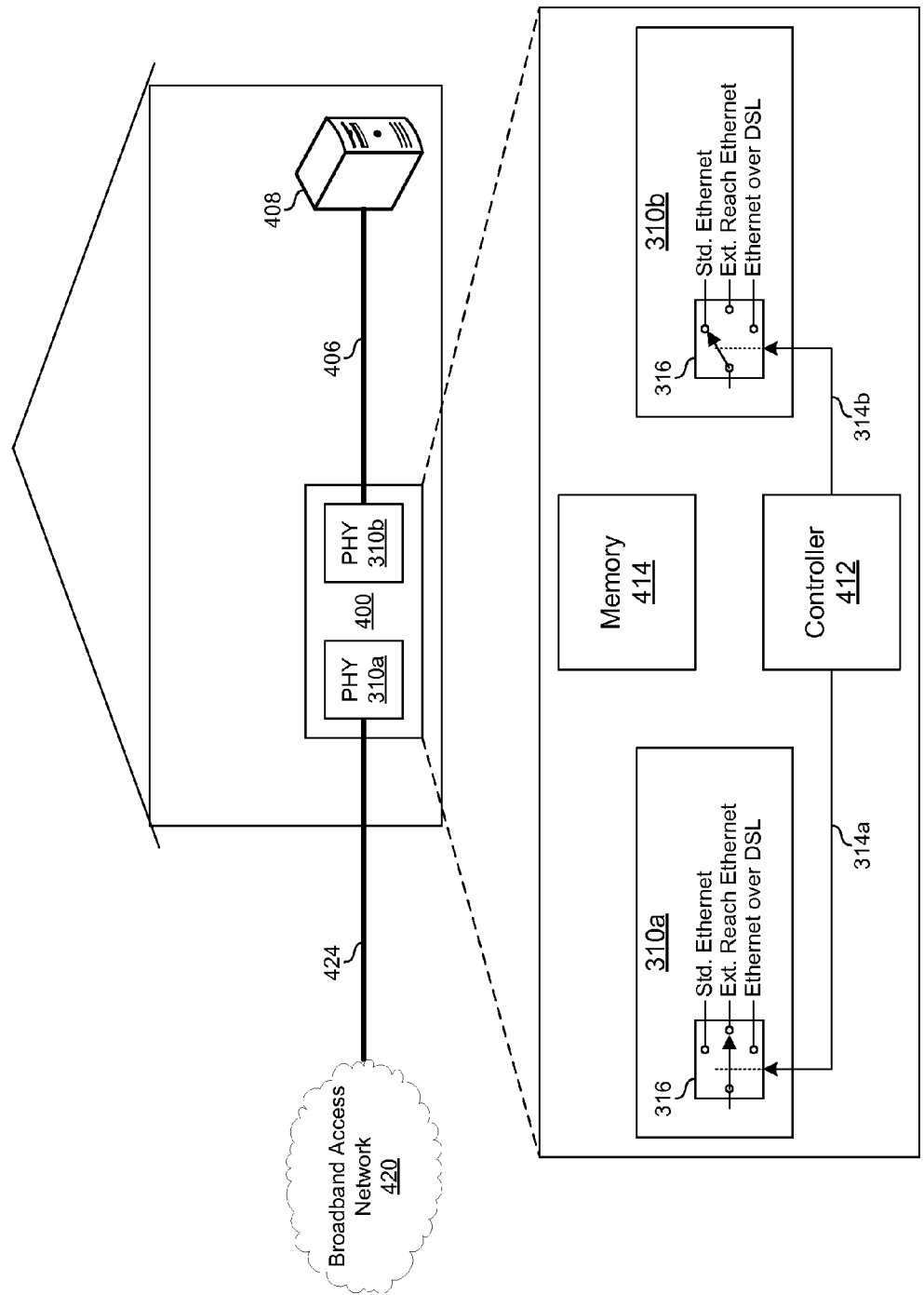
FIG. 4B is a diagram illustrating use of a configurable multi-use PHY for extended reach Ethernet communications, in accordance with an embodiment of the invention.

FIG. 4B is a diagram illustrating use of a configurable multi-use PHY for extended reach Ethernet communications, in accordance with an embodiment of the invention. Referring to FIG. 4B, there is shown a network device 400 communicatively coupled to a broadband access network 420 and a link partner 408. The network device 400, its PHYs 310a and 310b, controller 412, and memory 414 may be as described with respect to FIG. 4A.

The broadband access network 402 may be owned and/or operated by a service provider such as a telephone company. The broadband access network 402 may provide internet connectivity to homes and businesses utilizing Extended reach Ethernet techniques such as those described in United States patent application Ser. No. 61/101,072 filed on Sep. 29, 2009, and United States patent application Ser. No. 12/495,496 filed on Jun. 30, 2009, referenced and incorporated in paragraph [0001] above. In this regard, the rate at which the broadband access network 420 communicates with the network device 400 may be adapted based on characteristics of the link 424, where exemplary characteristics comprise a grade of the link, a length of the link, a number of channels available on the link, temperature of the link, and interference present on the link.

In operation, the Ethernet PHYs 310a and 310b may be configured for communication over the respective links 424 and 406. In an exemplary embodiment of the invention, the link 424 may comprise more than 100 meters of Cat-5e UTP and the link 406 may comprise less than 100 M of CAT-5e UTP. Accordingly, the Ethernet PHY 310a may be configured for extended reach Ethernet and the Ethernet PHY 310b may be configured into a standard Ethernet mode. In this regard, the rate at which data is communicated over the link 424 and/or the number of channels of the link 424 over which data is communicated may be configured based on the characteristics of the link 424. Adjusting the data rate of communications on the link 424 may compensate, for example, for the increased delay, noise, and/or attention of the link 424. In this regard, the network device 400 may function as a modem, a switch, and/or a router to provide Internet access to devices such as the device 408. The Ethernet PHY 310b, on the other hand, may communicate over the link 406 may at a standard rate as defined by, for example, 10BASE-T, 100BASE-T, 1000BASE-T, or 10GBASE-T.

The protocols and link characteristics described with regard to FIG. 4B are for illustration purposes and the invention is not so limited. For example, both links may be longer than 100M and both Ethernet PHYs 310a and 310b may be configured into an Extended reach mode. Also, the network device 400 comprises two PHYs for illustration only and a device such as network device 400 may comprise any number of Ethernet PHYs each of which may be configurable and/or may communicate over copper, optical fiber, or backplane.

Figure 4C:
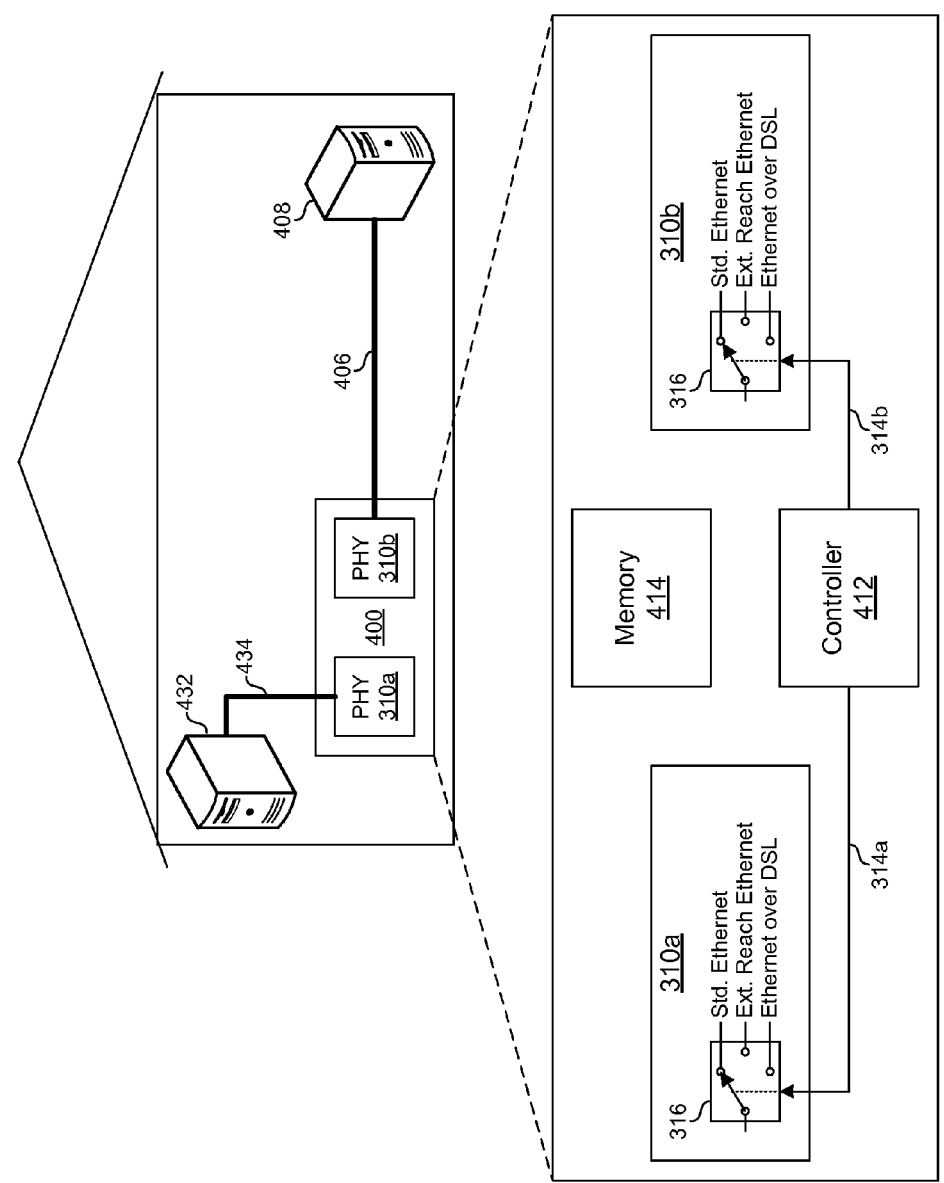
FIG. 4C is a diagram illustrating use of a configurable multi-use PHY for standard Ethernet communications, in accordance with an embodiment of the invention.

FIG. 4C is a diagram illustrating use of a configurable multi-use PHY for standard Ethernet communications, in accordance with an embodiment of the invention. Referring to FIG. 4B, there is shown a network device 400 communicatively coupled to a link partner 432 and a link partner 408. The network device 400, its PHYs 310a and 310b, controller 412, and memory 414 may be as described with respect to FIG. 4A.

In operation, the Ethernet PHYs 310a and 310b may be configured for communication over the respective links 434 and 406. In an exemplary embodiment of the invention, the links 434 and 406 may each comprise less than 100 meters of CAT-5e UTP. Accordingly, the Ethernet PHYs 310a and 310b may be configured into a standard Ethernet mode. In this regard, the network device 400 may function as a network switch, network controller, and/or a router between the devices 432 and 408 and possibly additional devices not shown in FIG. 4C. The Ethernet PHYs 310a and 310b may each communicate over the link 406 at a standard rate as defined by, for example, 10BASE-T, 100BASE-T, 1000BASE-T, or 10GBASE-T, and in some instances may communicate at different rates, which may be non-standard rates.

The protocols and link characteristics described with regard to FIG. 4B are for illustration purposes and the invention is not so limited. For example, both links may be longer than 100 meters and both Ethernet PHYs 310a and 310b may be configured into an extended reach mode. Also, the network device 400 comprises two PHYs for illustration only and a device such as network device 400 may comprise any number of Ethernet PHYs each of which may be configurable and/or may communicate over copper, optical fiber, or backplane.

Figure 5A:
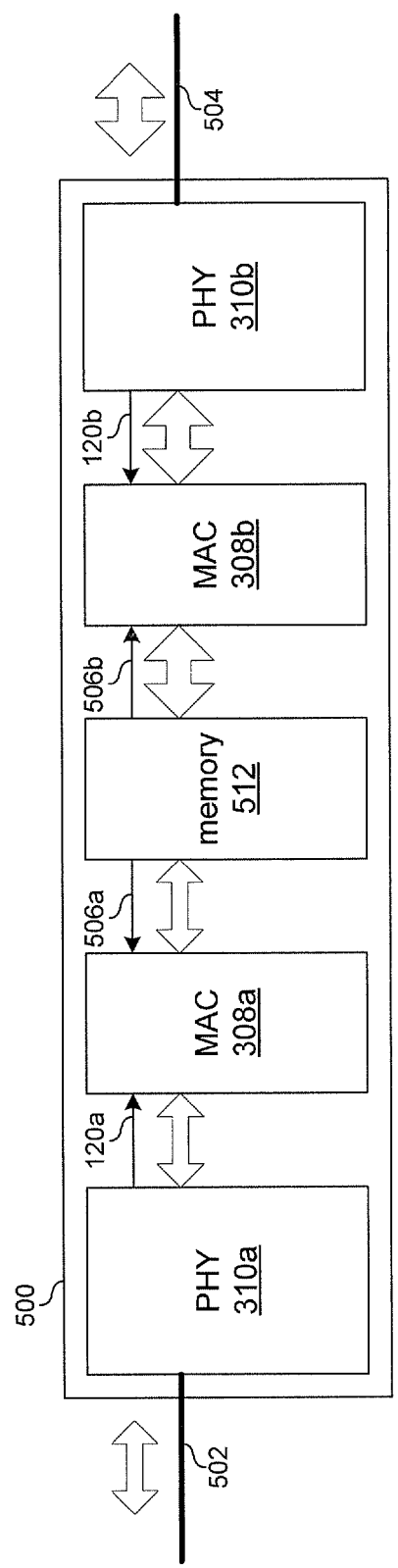
FIG. 5A is a functional block diagram illustrating a network device operable to convey data between network links having different characteristics, in accordance with an embodiment of the invention.

FIG. 5A is a functional block diagram illustrating a network device operable to convey data between network links having different characteristics, in accordance with an embodiment of the invention. Referring to FIG. 5A, there is shown a network device 500 comprising Ethernet PHYs 310a and 310b, MACs 308a and 308b, and memory 512. The Ethernet PHYs 310a and 310b and the MACs 308a and 308b may be as described with respect to FIG. 3.

The memory 512 may comprise suitable logic, circuitry, interfaces, and/or code that may be operable to buffer data being conveyed between the MACs 308a and 308b.

In operation, data may be received via one of the Ethernet PHYs 310a and 310b and transmitted via the other of the PHYs 310a and 310b. The PHY 310a may be configured based on characteristics of the link 504 and the PHY 310b may be configured based on characteristics of the link 504. Accordingly, the rate at which the data is transmitted by one of the PHYs 310a and 310b may be different than the rate at the data may be transmitted via the other of the PHYs 310a and 310b. For example, the links 502 and 504 may comprise different physical media, comprise different grades of physical media, be different lengths, be coupled to different types of network devices, and/or comprise a different numbers of channels. Consequently, as data is received via the Ethernet PHY 310a for transmission via the Ethernet PHY 310b the different data rates may be matched by buffering data in the memory 512.

In an exemplary embodiment of the invention, data may arrive via the Ethernet PHY 310a faster than the Ethernet PHY 310b may transmit the data. Consequently, the Ethernet PHY 310b may utilize CRS 120b to control the transfer of data from the MAC 308b to the Ethernet PHY 310b, which in turn may determine the rate at which the MAC 308b reads data from the memory 512. Consequently, the memory 512 may eventually reach a level or capacity that is beyond a particular threshold and the memory 512 may be unable to receive more data from the MAC 308a until additional data is read from the memory 512 and transmitted by the Ethernet PHY 310b. An indication that the memory 512 is filled above the particular threshold may be provided to the MAC 308a via a signal 506a. Upon detecting that the memory 512 is at a level above the particular threshold, the MAC 308a and/or the PHY 310a may notify the link partner sending the data. As a result, the link partner may pause transmission of the data or alter a rate at which it transmits the data to the network device 500. In this manner, the network device 500 may be operable to utilize a back pressure to control data transmitted to the network device 500 by a link partner. Additional details of controlling traffic in the network device 500 are described with respect to FIGS. 5B and 5C below.

In one embodiment of the invention, the network device 500 may be a MACSec PHY adapted to convert between two data rates and/or network links. In this regard, a second PHY 310b may be instantiated or coupled to a MACSec PHY such that the MACSec PHY is operable to interface to two network links. In this regard, the network device 500 may be configurable to operate as a MACSec PHY or as a converter between two network links. The memory 512 may either be utilized for implementing MACSec protocols or for buffering data to rate match the network link 502 and the network link 504.

Figure 5B:
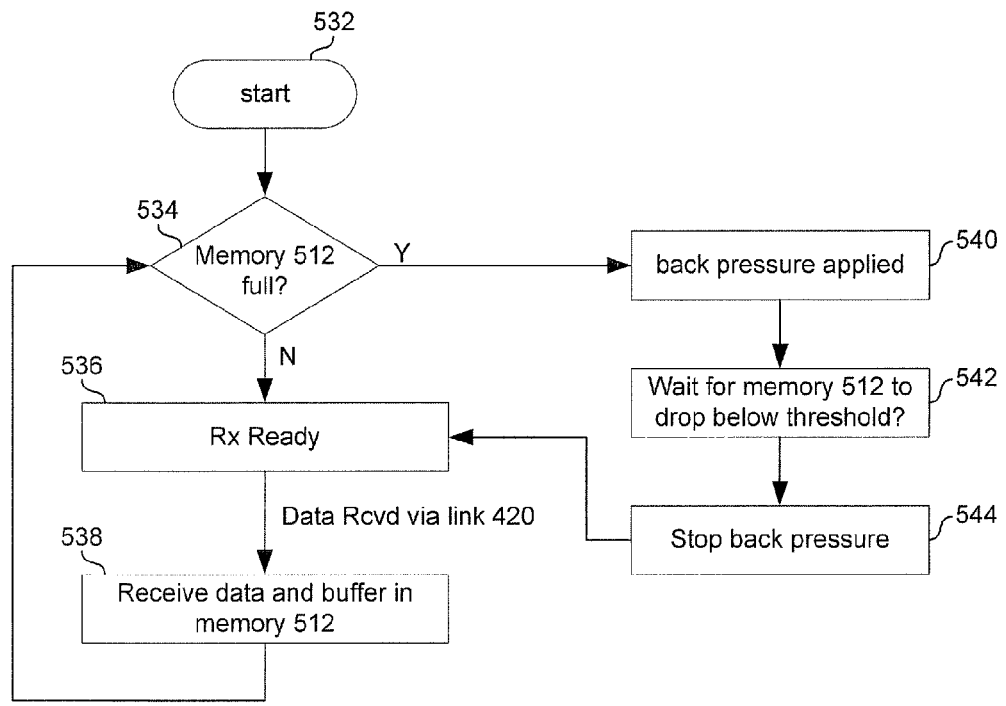
FIG. 5B is a flow chart illustrating exemplary steps for controlling ingress data flow in a network device that conveys data between network links having different characteristics, in accordance with an embodiment of the invention.

FIG. 5B is a flow chart illustrating exemplary steps for controlling ingress data flow in a network device that conveys data between network links having different characteristics, in accordance with an embodiment of the invention. Referring to FIG. 5B, start step 532, the exemplary steps may advance to step 534. In step 534, it may be determined whether the memory 512 is at a level that is above a particular threshold, where the threshold may be configurable. In instances that the memory 512 is not at a level that is above the particular threshold, the exemplary steps may advance to step 536.

In step 536, the PHY 310a and MAC 308a may be configured and/or prepared to receive data. In this regard, in some instances the MAC 308a and/or the PHY 310a may be enabled to operate in an energy saving mode and in step 536 the MAC 308a and/or the PHY 310a may transition out of the energy saving mode and may be trained and/or synchronized with a link partner. Upon receiving data from the link partner, the exemplary steps may advance to step 538.

In step 538 the PHY 310a may process the received data and convey the received data to the MAC 308a. The MAC 308a may store the data in the memory 512. Subsequent to step 538, the exemplary steps may advance to step 534.

Returning to step 534, in instances that the memory 512 is at a capacity or level that is above the particular threshold, the exemplary steps may advance to step 540. In step 540, the MAC 308a and/or 319a may generate one or more signals or otherwise notify link partner(s) to pause or slow transmission of data to the network device 500. Subsequent to step 540, the exemplary steps may advance to step 542.

In step 542, the MAC 308a and/or the PHY 310a may wait for the memory 512 to drain below a particular threshold. In this regard, the duration of the wait may depend on the rate at data from the memory 512 by the MAC 308b and being transmitted by the PHY 310b. In some embodiments of the invention, portions of the network device 500, such as the MAC 308a and/or the PHY 308a, may transition to an energy saving mode during this time. Once an amount of data buffered in the memory 512 drops below the particular threshold, the exemplary steps may advance to step 544.

In step 544, the MAC 308a and/or the PHY 310a may stop applying back pressure to the link partner and/or notify the link partner to resume transmission of data to the network device 500. Subsequent to step 544, the exemplary steps may advance to step 536.

Figure 5C:
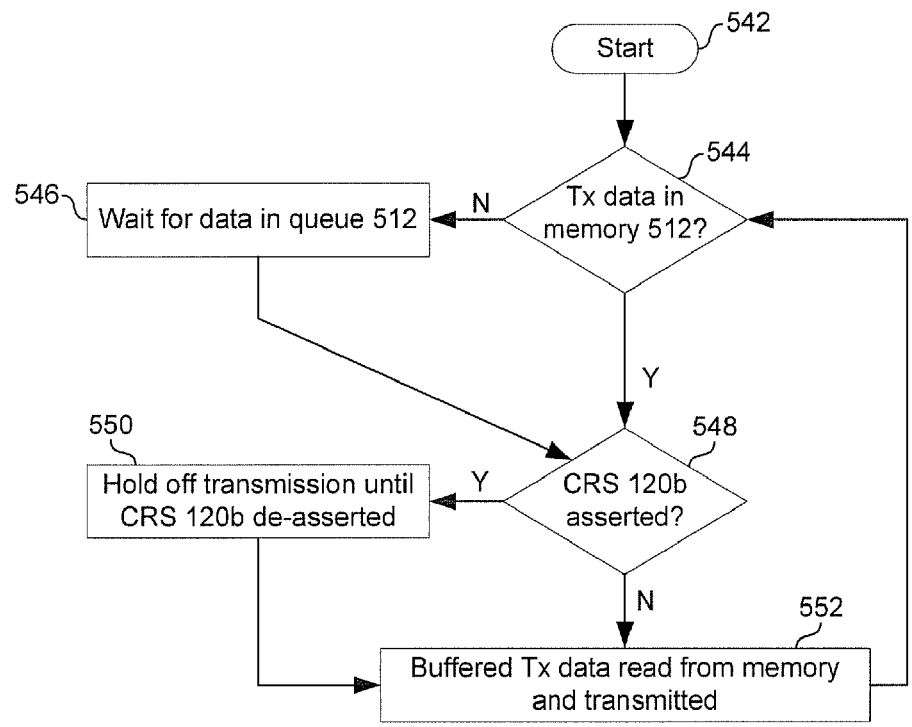
FIG. 5C is a flow chart illustrating exemplary steps for controlling egress data flow in a network device that conveys data between network links having different characteristics, in accordance with an embodiment of the invention.

FIG. 5C is a flow chart illustrating exemplary steps for controlling egress data flow in a network device that conveys data between network links having different characteristics, in accordance with an embodiment of the invention. Referring to FIG. 5C, subsequent to start step 542, the exemplary steps may advance to step 544.

In step 544, it may be determined whether there is data to be transmitted that is buffered in the memory 512. In instances that there is data buffered in the memory 512, the exemplary steps may advance to step 548. In step 548, it may be determined whether the CRS 120b is asserted. In instances that CRS 120b is not asserted, the exemplary steps may advance to step 552. In step 552, the MAC 308b may read data out of the memory 512, process it accordingly, and convey it to the PHY 310b. The PHY 310b may process the data accordingly and transmit it onto the link 504. Subsequent to step 552, the exemplary steps may advance to step 544. Returning to step 548, in instances that CRS 120*b* is asserted, the exemplary steps may advance to step 550. In step 550, the MAC 308*b* may hold-off or defer reading data from the memory 512 and conveying the data to the PHY 310*b* until CRS 120*b* is de-asserted. Upon de-assertion of the CRS 120*b*, the exemplary steps may advance to step 552.

Returning to step 544, in instances that there is no buffered data in the memory 512, which is pending transmission, the exemplary steps may advance to step 546. In step 546 the MAC 308*b* and the PHY 310*b* may await arrival of data to be transmitted. In some embodiments of the invention, the MAC 308*b*, the PHY 310*b*, and/or other portions of the network device 500 may be configured to operate in an energy saving mode during this time.

Various aspects of a method and system for network communications via a configurable multi-use Ethernet PHY are provided. In an exemplary embodiment of the invention, a first Ethernet PHY 310 may be configured based on characteristics of a network link 304 over which the first Ethernet PHY 310 communicates, and a rate at which data is conveyed from a first media access controller (MAC) 308 to the first Ethernet PHY 310 via a media independent interface (MII) 114 may be controlled via a carrier sense signal 120 of the MII 114. The carrier sense signal 120 may be controlled based on a rate at which the first Ethernet PHY 310 transmits data over the network link 304. The rate at which the first Ethernet PHY 310 transmits data over the network link 304 may be determined by monitoring a queue 115 that buffers data to be transmitted. The carrier sense signal 120 may be asserted when an amount of data stored in the queue 115 is above a threshold.

The carrier sense signal 120 may be de-asserted when the amount of data stored in the queue 115 is below a threshold. The first Ethernet PHY 310 may be configured based on a length of the network link 304. The first Ethernet PHY 310 may be configured based on a grade of the network link, where exemplary grades comprise Cat-1 through Cat-7a cable. The first Ethernet PHY 310 may be configured into one of a plurality of modes comprising an Ethernet over digital subscriber line (DSL) mode, an extended reach mode, and a standard Ethernet mode. The MII 114 may comprise one of a media independent interface (MII), a gigabit MII (GMII), a reduced MII (RMII), reduced gigabit MII (RGMII), and 10 gigabit MII (XGMII).

In some embodiments of the invention, a first Ethernet PHY 310*b*, a first MAC 308*b*, a second Ethernet PHY 310*a*, and a second MAC 308*a* may be integrated within a network device 500. In such embodiments of the invention, data may be received by the second Ethernet PHY 310*a*, buffered in a queue 512, and transmitted by the first Ethernet PHY 310*b*, where the second Ethernet PHY 310*a* may receive the data at a rate different than the rate at which the first Ethernet PHY 310*b* transmits the data. In some instances, the second Ethernet PHY 310*a* may be operable to request that a link partner pause or slow down transmission of data based on a status of the queue 512.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for network communications via a configurable multi-use Ethernet PHY.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for networking, the method comprising:
   in a first Ethernet PHY, said first Ethernet PHY being operable in a plurality of modes, a first mode of said plurality of modes comprising an Ethernet over digital subscriber line (DSL) mode, a second mode of said plurality of modes comprising a mode in which said first Ethernet PHY communicates over a cable that is 100 meters or less in length, and third mode of said plurality of mods comprising a mode in which said first Ethernet PHY communicates over a cable that is longer than 100 meters:
   determining characteristics of a cable over which said first Ethernet PHY communicates;
   selecting, during operation of said first Ethernet PHY, one of said first mode, said second mode, and said third mode based on said determined characteristics; and
   controlling a rate at which data is conveyed from a first media access controller (MAC) to said first Ethernet PHY via a first media independent interface (MII) by controlling a carrier sense signal of said first MII based on a rate at which said first Ethernet PHY transmits data over said cable.

2. The method according to claim 1, comprising monitoring a queue that buffers data to be transmitted by said first Ethernet PHY to determine said rate at which said first Ethernet PHY transmits data over said cable.

3. The method according to claim 2, comprising asserting said carrier sense signal when an amount of data stored in said queue is above a threshold.

4. The method according to claim 2, comprising de-asserting said carrier sense signal when an amount of data stored in said queue is below a threshold.

5. The method according to claim 1, wherein said characteristics comprise a length of said cable.

6. The method according to claim 1, wherein:
said characteristics comprise a grade of said cable;
said grade comprises one of: category 1 cable, category 2 cable, category 3 cable, category 4 cable, category 5 cable, category 5e cable, category 6 cable, category 6a cable, category 7 cable, and category 7a cable.

7. The method according to claim 1, wherein said first MII comprises one of a media independent interface (MII), a gigabit MII (GMII), a reduced MII (RMII), reduced gigabit MII (RGMII), and 10 gigabit MII (XGMII).

8. The method according to claim 1, wherein:
said first Ethernet PHY, said first MAC, a second Ethernet PHY, and a second MAC are integrated within a network device; and
said data is received by said second Ethernet PHY, buffered in a queue, and transmitted by said first Ethernet PHY, wherein said second Ethernet PHY receives said data at a rate different than said rate at which said first Ethernet PHY transmits said data.

9. The method according to claim 8, wherein said second Ethernet PHY requests that a link partner pause or slow down transmission of said data when said queue filled above a threshold.

10. A system for networking, the system comprising:
one or more circuits for use in a first Ethernet PHY, said one or more circuits being operable in a plurality of modes, a first mode of said plurality of modes comprising an Ethernet over digital subscriber line (DSL) mode, a second mode of said plurality of modes comprising a mode in which said first Ethernet PHY communicates over a cable that is 100 meters or less in length, and third mode of said plurality of modes comprising a mode in which said first Ethernet PHY communicates over a cable that is longer than 100 meters, and said one or more circuits are operable to:
determine characteristics of cable over which said first Ethernet PHY communicates;
select, during operation of said first Ethernet PHY, one of said first mode, said second mode, and said third mode based on said determined characteristics; and
control a rate at which data is conveyed from a first media access controller (MAC) to said first Ethernet PHY via a first media independent interface (MII) by controlling a carrier sense signal of said first MII based on a rate at which said first Ethernet PHY transmits data over said cable.

11. The system according to claim 10, wherein said one or more circuits are operable to monitor a queue that buffers data to be transmitted by said first Ethernet PHY to determine said rate at which said first Ethernet PHY transmits data over said cable.

12. The system according to claim 11, wherein said one or more circuits are operable to assert said carrier sense signal when an amount of data stored in said queue is above a threshold.

13. The system according to claim 11, wherein said one or more circuits are operable to de-assert said carrier sense signal when an amount of data stored in said queue is below a threshold.

14. The system according to claim 10, wherein said characteristics comprise a length of said cable.

15. The system according to claim 10, wherein:
said characteristics comprise a grade of said cable;
said grade comprises one of: category 1 cable, category 2 cable, category 3 cable, category 4 cable, category 5 cable, category 5e cable, category 6 cable, category 6a cable, category 7 cable, and category 7a cable.

16. The system according to claim 10, wherein said first MII comprises one of a media independent interface (MII), a gigabit MII (GMII), a reduced MII (RMII), reduced gigabit MII (RGMII), and 10 gigabit MII (XGMII).

17. The system according to claim 10, wherein:
said first Ethernet PHY, said first MAC, a second Ethernet PHY, and a second MAC are integrated within a network device; and
said data is received by said second Ethernet PHY, buffered in a queue, and transmitted by said first Ethernet PHY, wherein said second Ethernet PHY receives said data at a rate different than said rate at which said first Ethernet PHY transmits said data.

18. The system according to claim 17, wherein said second Ethernet PHY requests that a link partner pause or slow down transmission of said data when said queue filled above a threshold.

19. A method for networking, the method comprising:
in a first Ethernet PHY, said first Ethernet PHY being operable in a plurality of modes, a first mode of said plurality of modes comprising an Ethernet over digital subscriber line (DSL) mode, a second mode of said plurality of modes comprising a mode in which said first Ethernet PHY communicates over a cable that is 100 meters or less in length, and third mode of said plurality of modes comprising a mode in which said first Ethernet PHY communicates over a cable that is longer than 100 meters:
determining characteristics of a cable over which said first Ethernet PHY communicates;
selecting, during operation of said first Ethernet PHY, one of said first mode, said second mode, and said third mode based on said determined characteristics; and
controlling a rate at which data is conveyed from a first media access controller (MAC) to said first Ethernet PHY via a first media independent interface (MII) by generating and sending pause frames from said first Ethernet PHY to said first MAC based on a rate at which said first Ethernet PHY transmits data over said cable.

* * * * *